Oct. 17, 1961  A. L. HUBBARD  3,004,376
MOISTENING ASSEMBLY FOR COTTON PICKING SPINDLES
Filed Sept. 4, 1959
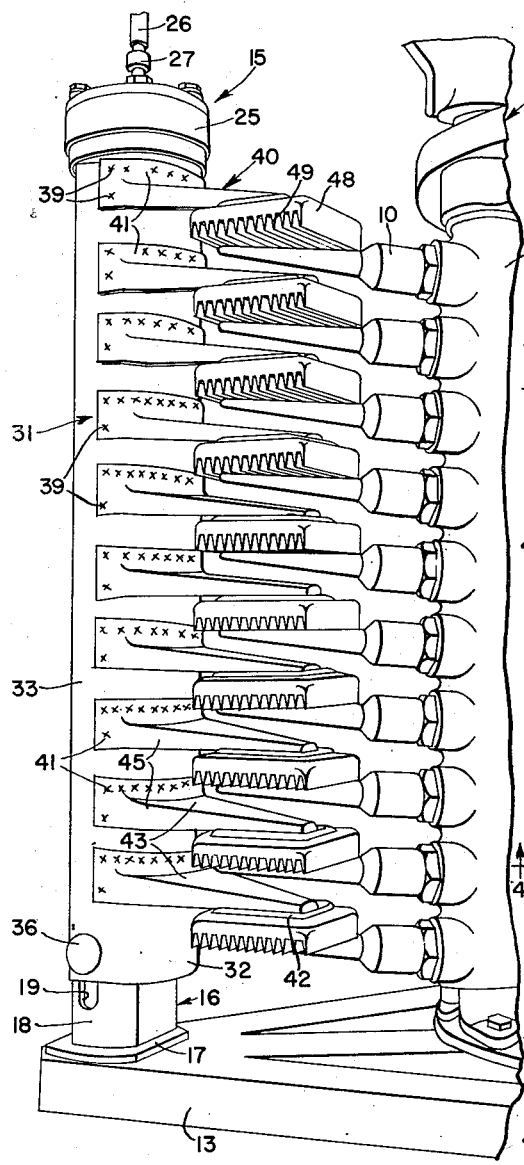
FIG. 1
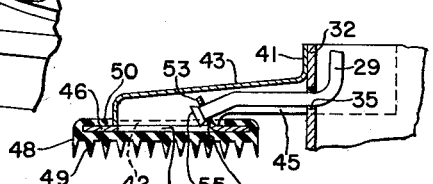
FIG. 2
FIG. 3
FIG. 4
INVENTOR.
A.L. HUBBARD
BY
ATTORNEYS

United States Patent Office 3,004,376
Patented Oct. 17, 1961

3,004,376
MOISTENING ASSEMBLY FOR COTTON PICKING SPINDLES
Arthur L. Hubbard, Des Moines, Iowa, assignor to Deere & Company, Moline, Ill., a corporation of Delaware
Filed Sept. 4, 1959, Ser. No. 838,141
10 Claims. (Cl. 56—41)

This invention relates to a moistening system for a cotton picker spindle drum. Still more particularly, this invention relates to a fabricated moistener device which is both unique and novel in its manner of construction and offers simplicity in a heretofore rather complicated mechanism.

It is the main purpose and object of the present invention to provide a moistener mechanism used in a conventional type cotton harvesting machine which is of a new and novel nature, which may be manufactured at a relatively low price, and which may be so constructed as to have all parts thereto accessible to the operator.

It is a further object of the present invention to provide a moistener mechanism which may be fabricated from sheet metal and may be easily removed from the cotton harvester for both replacement and repair.

Other objects and advantages of the present invention will become apparent to those skilled in the art as the nature of the invention is better understood from the following disclosure and as shown in the accompanying drawings.

FIG. 1 is a perspective view of the moistener assembly and a portion of the picker drum.

FIG. 2 is a view of the moistener assembly taken from one side thereof with parts broken away.

FIG. 3 is a sectional view taken substantially along the line 3—3 of FIG. 2.

FIG. 4 is a vertical sectional view taken substantially along the line 4—4 of FIG. 3.

The moistener mechanism herein shown and described is to be used in conjunction with a conventional type cotton harvester of the type shown and described in U.S. Patent 2,795,096, issued to Mr. R. H. Meier, June 11, 1957. The moistener mechanism is used with a picker drum having a series of vertically spaced spindles 10 carried on a picker bar 11 to project laterally outwardly. Conventionally there are a plurality of bars for each drum all of which move in an orbit formed about an upright axis so that the spindles 10 will move laterally outwardly from a picker housing into the cotton plant and snag or otherwise harvest the ripe cotton bolls from the plant. The picker drum, here indicated by the reference numeral 12, is carried on a conventional type harvester frame 13. The drum 12 rotates to cause the spindles to first snag the bolls from the cotton plants and then to draw them inwardly of the picker housing, which is not shown, to engage a doffing mechanism, also not shown, prior to the time of engagement with the moistening mechanism, here indicated in its entirety by the reference numeral 15. In the normal operation of the picker drum 12, the spindles 10 will also tend to pick up various juices of the cotton plant as well as incidental trash; consequently, the necessity of cleaning the spindles 10 periodically becomes obvious.

The moistening mechanism 15 is composed of a base member 16 which has a laterally disposed plate 17 lying on the upper surface of the main frame 13 and a U-shaped section 18 extending upwardly from the upper surface of the base plate 17. The U-shaped section 18 has upright and elongated slots 19, 20 therein which, as will later become apparent, serve as means for adjusting the moistening mechanism vertically. The base member 16 is mounted on the frame 13 by a central bolt 21 which basically provides a vertical pivot for the base plate 17 and a pair of locking bolts 22 spaced from the bolt 21. The bolts 22 may be removed and the entire moistening mechanism swung laterally about the pivot of the bolt 21.

Spaced vertically from the base or footer 16 is a header member, indicated in its entirety by the reference numeral 25. The header 25 has an opening at its upper surfaced through which fluid is introduced from a hose 26 and coupling 27. The header 25 has a plurality of angularly spaced passages 28 with lower outlets through which fluid may pass into tubes 29 which may be hoses, copper tubing, or other conventional type tubing.

The lower surface of the header 25 is welded as at 30 to the upper edges of a U-shaped columnar member 31 which extends downwardly from the header to a position adjacent the base or footer member 16. The columnar U-shaped member 31 has its bight portion 32 facing the spindles 10 with oppositely disposed leg portions or sections 33, 34 extending away from the spindles. As may be readily apparent, the leg portions 33, 34 are disposed on opposite sides of the tubes 29 therefore affording protection for the tubes. The bight portion 32 is provided with a plurality of vertically spaced openings 35 through which the tubing 29 projects so that the terminal end of the individual tubes is positioned outwardly of the columnar member 31. The lower end of the U-shaped columnar member 31 is fixed to the footer or base member 16 by means of bolt and nut combinations 36, 37 which extend through the slots 19, 20 of the base member 16.

Positioned adjacent each of the vertically spaced openings 35 is an arm structure 40 having a vertically disposed supporting flange 41 at one end which conforms to the shape of and embraces the outer surface of the columnar member 31. The vertical flanges 41 are fixed to the outer surface of the columnar member 31 by means of spot welds, indicated at 39. At the opposite or outer end of the arms 40 are laterally disposed flanges 42 which extend outwardly from a position beneath the central or main arm portion 43 of the arm. The arm portions 43 are hollow U-shaped members opening downwardly and overlying the respective tubing 29 which extends through the adjacent opening 35. Each arm portion 43 has opposite depending leg portions 44, 45 on opposite sides of the tubing 29.

Spot welded to the flanges 42 is a laterally disposed plate 46. Moistener pads 48 having teeth portions 49 depending downwardly to normally engage the spindles 10 have lip portions 50 which overlie the edges of the plate 46. The pads 48 are composed of rubber or other type of elastic material which permits the lip portions 50 to be deflected or stretched so as to permit mounting over the outer edges of the plate 46.

Each plate 46 is further provided with an elongated slot 52 formed by bending a tab 53 in the plate 46 upwardly and toward the main portion 43 of the arm 40. The tab 53 is provided with an opening 54 through which the terminal end of the tube 29 is suspended. The tube 29 is flared at 55 so as to prevent slippage of the tube 29 out of the tab 53.

The invention operates in the following manner. Fluid is introduced into the header 25 through the hose 26 and coupling 27 and is distributed into the various tubes 29 which in turn permit the fluid to pass downwardly and under the arms 40 where the fluid passes through the terminal or flared ends 55. The fluid then passes into the pads 48 which are suitably porous to permit the fluid to flow outwardly to the ends of the teeth 49. There are various metering devices as well as other types of shutoff mechanisms which permit the fluid to pass through the tubes 29 at the desired times. Such are not deemed important for purposes of the present invention and are therefore not described or shown. However, it should be recognized that the present mechanism will normally operate in combination with such devices.

While only one form of the invention has been shown it should be recognized that other forms and modifications will occur to those skilled in the art. Therefore, while the present form was shown and described in detail for purposes of clearly and concisely illustrating the principles of the invention, it is not the intention to so limit to narrow the invention beyond the broad concepts set forth in the appended claims.

What is claimed is:

1. A moistener assembly for a cotton harvesting unit having a main frame and vertically spaced picker spindles comprising: a base member mounted on the frame; an upright U-shaped columnar member fixedly attached to the base member having the bight portion thereof facing the spindles and opposite leg portions extending away from the spindles, said columnar member having therein a series of vertically spaced openings spaced on the order of the vertical spacing of the spindles; a fluid-distributing header fixed adjacent the upper end of the columnar member and having a series of fluid outlets therein; a plurality of tubes, each extending from a respective outlet through one of the spaced openings and having a terminal end spaced outwardly of the respective opening; said tubes being disposed behind the bight portion and between the leg portions of the columnar member; a plurality of vertically spaced laterally disposed arms, each of said arms having a vertical supporting flange at one end conforming to the shape of and embracing the outer surface of the column member proximate an opening, a laterally disposed flange at the opposite end, and an arm section between said ends opening downwardly and embracing from opposite sides and from above the end of the tube extending through the respective opening; means fixing the vertical supporting flanges to the U-shaped columnar member; and moistener pad means carried by the laterally disposed flanges of the arms.

2. A moistener assembly for a cotton harvesting unit having a main frame and vertically spaced picker spindles comprising: a base member mounted on the frame; an upright hollow columnar member fixedly attached to the base member; said columnar member having therein a series of vertically spaced openings spaced apart on the order of the spindles; a fluid-distributing header fixed adjacent the upper end of the columnar member and having a series of fluid outlets therein; a plurality of tubes, each extending from a respective outlet through one of the spaced openings and having a terminal end spaced outwardly of the respective opening; said tubes being disposed within the columnar member; a plurality of vertically spaced laterally disposed arms, each of said arms having a vertical supporting flange at one end conforming to the shape of and embracing the outer surface of the columnar member proximate an opening, a laterally disposed flange at the opposite end, and an arm section between said ends opening downwardly and embracing from opposite sides and from above the end of the tube extending through the respective opening; means fixing the vertical supporting flanges to the columnar member; and moistener pad means carried by the laterally disposed flanges of the arms.

3. A moistener assembly for a cotton harvesting unit having a main frame and vertically spaced picker spindles comprising: an upright hollow columnar member fixedly attached to the frame; said columnar member having therein a series of vertically spaced openings spaced apart on the order of the vertical spacing of the spindles; a fluid-distributing header fixed adjacent the upper end of the columnar member and having a series of fluid outlets therein; a plurality of tubes, each extending from a respective outlet through one of the spaced openings and having a terminal end spaced outwardly of the respective opening; said tubes being disposed within the columnar member; a plurality of vertically spaced laterally disposed arms, each of said arms having a vertical supporting flange at one end conforming to the shape of and embracing the outer surface of the columnar member proximate an opening, a laterally disposed flange at the opposite end, and a laterally disposed hollow arm section between said ends having its hollow center in registry with one of the vertical openings to thereby cover the end of the tube extending through the respective opening; means fixing the vertical supporting flanges to the columnar member; and moistener pad means carried by the laterally disposed flanges of the arms.

4. The invention defined in claim 3 in which the moistener pad means includes a laterally disposed plate fixed to the lateral flange on the respective arm with outer edges thereof extending beyond edges of the flange, the laterally disposed plate has thereon a vertically disposed element extending into the hollow portion of the respective arm with means on the element for receiving the terminal end of the respective tube, and further has an opening therein through which fluid discharging from the terminal end may pass, and a moistener pad lying adjacent the surface of the plate with a peripheral lip overlying the edges of the plate.

5. The invention defined in claim 2 in which the columnar member is fixedly attached to the base member by means permitting adjustment of the columnar member vertically relative to the base member.

6. A moistener assembly for a cotton harvesting unit having a main frame and vertically spaced picker spindles comprising: an upright U-shaped columnar member fixedly attached to the frame having the bight portion thereof facing the spindles and opposite leg portions extending away from the spindles, said columnar member having therein a series of vertically spaced openings spaced apart on the order of the spindles; a fluid-distributing header fixed adjacent the upper end of the columnar member and having a series of fluid outlets therein; a plurality of tubes, each extending from a respective outlet through one of the spaced openings and having a terminal end spaced outwardly of the respective opening; said tubes being disposed behind the bight portion and between the leg portions of the columnar member; a plurality of vertically spaced laterally disposed arm, each of said arms having a vertical supporting flange at one end conforming to the shape of and embracing the outer surface of the columnar member proximate an opening, a laterally disposed flange at the opposite end, and a laterally disposed hollow arm section between said ends having its hollow center in registry with one of the vertical openings to thereby cover the end of the tube extending through the respective opening; means fixing the vertical supporting flanges to the U-shaped columnar member; and moistener pad means carried by the laterally disposed flanges of the arms.

7. A moistener assembly for a cotton harvesting unit having a main frame and vertically spaced picker spindles comprising: an upright U-shaped columnar member fixedly attached to the frame having the bight portion thereof facing the spindles and opposite leg portions extending away from the spindles, said columnar member having therein a series of vertically spaced openings spaced apart on the order of the spindles; fluid-distributing means supported on the frame including a plurality of fluid conducting tubes, each tube being disposed behind the bight portion and between the leg portions of the columnar member and extending through one of the respective openings to terminate outwardly of the bight portion; a plurality of vertically spaced laterally disposed arms, each of said arms having a vertical supporting flange at one end conforming to the shape of and embracing the outer surface of the columnar member proximate an opening, a laterally disposed flange at the opposite end, and an arm section between said ends opening downwardly and embracing from opposite sides and from above the tube extending through the respective opening;

means fixing the vertical supporting flanges to the U-shaped columnar member, moistener pad means carried by the laterally disposed flanges of the arms; and means at said opposite ends of the arms connecting the terminal ends of the tubes to the arms whereby fluid passed through the tubes will move into the moistener pad means.

8. A moistener assembly for a cotton harvesting unit having a main frame and vertically spaced picker spindles comprising: an upright columnar member fixedly attached to the frame, said columnar member having therein a series of vertically spaced openings spaced apart on the order of the spindles; fluid-distributing means supported on the frame including a plurality of fluid conducting tubes, each tube being disposed within the columnar member and extending through one of the respective openings to terminate outwardly of the columnar member; a plurality of vertically spaced laterally disposed arms, each of said arms having a vertical supporting flange at one end conforming to the shape of and embracing the outer surface of the columnar member proximate an opening and a hollow arm section embracing the tube extending through the respective opening, said arm section extending to an outer end spaced from the columnar member; means fixing the vertical supporting flanges to the U-shaped columnar member; moistener pad means carried on the outer ends of the arms; and means at the outer ends of the arms connecting the terminal ends of the tubes to the arms whereby fluid passed through the tubes will move into the moistener pad means.

9. A moistener assembly for a cotton harvesting unit having a main frame and vertically spaced picker spindles comprising: an upright columnar member fixedly attached to the frame, said columnar member having therein a series of vertically spaced openings spaced apart on the order of the spindles; fluid-distributing means supported on the frame including a plurality of fluid conducting tubes, each tube being disposed within the columnar member and extending through one of the respective openings to terminate outwardly of the columnar member; a plurality of vertically spaced laterally disposed arms, each of said arms having a vertical supporting flange at one end conforming to the shape of and embracing the outer surface of the columnar member proximate an opening and an arm section extending to an outer end spaced from the columnar member; means fixing the vertical supporting flanges to the U-shaped columnar member; moistener pad means carried on the outer ends of the arms; and tube mounting means on the arms connecting the ends of the tubes to the arms whereby fluid passed through the tubes will move into the moistener pad means.

10. A moistener assembly for a cotton harvesting unit having a main frame and vertically spaced picker spindles comprising: an upright columnar member fixedly attached to the frame, said columnar member having therein a series of vertically spaced openings spaced apart on the order of the spindles; fluid-distributing means supported on the frame including a plurality of fluid conducting tubes, each tube being disposed within the columnar member and extending through one of the respective openings to terminate outwardly of the columnar member; a plurality of vertically spaced laterally disposed arms, each of said arms having an inner end fixed to the columnar member and extending to an outer end spaced from the columnar member; moistener pad means carried on the outer ends of the arms; and tube mounting means on the arms connecting the ends of the tubes to the arms whereby fluid passed through the tubes will move into the moistener pad means.

References Cited in the file of this patent
UNITED STATES PATENTS

| 2,654,204 | Grosvenor | Oct. 9, 1953 |
| 2,787,880 | Fergason | Apr. 9, 1957 |
| 2,876,611 | Hubbard | Mar. 10, 1959 |
| 2,884,754 | Bornzin et al. | May 5, 1959 |